(12) United States Patent
Nakagawa et al.

(10) Patent No.: US 12,059,949 B2
(45) Date of Patent: Aug. 13, 2024

(54) INSTALLATION STRUCTURE OF ELECTRICAL COMPONENT MODULE IN VEHICLE

(71) Applicant: NISSAN MOTOR CO., LTD., Yokohama (JP)

(72) Inventors: Kenichi Nakagawa, Kanagawa (JP); Masahiro Oonishi, Kanagawa (JP); Masatsugu Mori, Kanagawa (JP); Jaemin Shin, Kanagawa (JP); Masahiro Ataka, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 336 days.

(21) Appl. No.: 17/620,283

(22) PCT Filed: Jun. 19, 2019

(86) PCT No.: PCT/IB2019/000636
§ 371 (c)(1),
(2) Date: Dec. 17, 2021

(87) PCT Pub. No.: WO2020/254846
PCT Pub. Date: Dec. 24, 2020

(65) Prior Publication Data
US 2022/0363119 A1 Nov. 17, 2022

(51) Int. Cl.
*B60K 1/04* (2019.01)
*B60H 1/00* (2006.01)

(52) U.S. Cl.
CPC ........... *B60K 1/04* (2013.01); *B60H 1/00028* (2013.01); *B60K 2001/0411* (2013.01); *B60Y 2306/01* (2013.01)

(58) Field of Classification Search
CPC .............. B60K 1/04; B60K 2001/0411; B60H 1/00028; B60Y 2306/01; B62D 21/152
See application file for complete search history.

(56) References Cited

U.S. PATENT DOCUMENTS 5,476,151 A * 12/1995 Tsuchida .............. B62D 21/152
180/274
6,371,229 B1 * 4/2002 Kakiuchi ............. B60K 5/1208
180/68.5

(Continued)

FOREIGN PATENT DOCUMENTS

DE 10 2011 050 707 A1 12/2012
JP 2007-230329 A 9/2007

(Continued)

*Primary Examiner* — Jeffrey J Restifo
(74) *Attorney, Agent, or Firm* — Foley & Lardner LLP

(57) ABSTRACT

An electrical component module is installed in a front section of a vehicle, and connected with a battery unit storing electricity for driving the vehicle. The electrical component module is supported by a vehicle body structure member (cross-member) extending in a lateral direction of the vehicle. The cross-member is closer to a passenger compartment than the electrical component module, and doesn't overlap with the electrical component module when viewed along any horizontal direction perpendicular to a vertical direction of the vehicle. Between the cross-member and the electrical component module, provided is a release mechanism for releasing the support of the electrical component module by the cross-member when receiving an impact from an opposite side to the passenger compartment.

6 Claims, 11 Drawing Sheets

(56) References Cited

U.S. PATENT DOCUMENTS

| | | | | |
|---|---|---|---|---|
| 6,827,168 | B2* | 12/2004 | Miyazaki | B60R 19/00 |
| | | | | 180/274 |
| 8,720,627 | B2* | 5/2014 | Suzuki | B60R 16/04 |
| | | | | 180/68.5 |
| 8,893,843 | B2* | 11/2014 | Hayano | B60L 15/007 |
| | | | | 180/68.5 |
| 9,079,508 | B2* | 7/2015 | Naito | B60L 1/003 |
| 9,101,060 | B2* | 8/2015 | Yamanaka | B60K 1/00 |
| 9,199,537 | B2* | 12/2015 | Hotta | B60L 58/30 |
| 9,203,233 | B2* | 12/2015 | Kitami | B60L 50/13 |
| 9,205,749 | B2* | 12/2015 | Sakamoto | B60L 15/2009 |
| 9,227,670 | B2 | 1/2016 | Schaal | |
| 9,409,495 | B2* | 8/2016 | Kobayashi | B60R 16/04 |
| 9,517,686 | B1* | 12/2016 | Paramasivam | H01M 50/244 |
| 9,630,501 | B2* | 4/2017 | Shiba | B60K 6/48 |
| 10,189,353 | B2* | 1/2019 | Sakamoto | B60K 28/14 |
| 11,027,679 | B2* | 6/2021 | Yuki | H05K 5/0004 |
| 11,305,628 | B2* | 4/2022 | Tanaka | B60K 1/04 |
| 2004/0090085 | A1* | 5/2004 | Kawasaki | B60L 50/66 |
| | | | | 296/187.09 |
| 2009/0226806 | A1* | 9/2009 | Kiya | B60R 16/04 |
| | | | | 429/186 |
| 2012/0305322 | A1 | 12/2012 | Schaal | |
| 2014/0345960 | A1* | 11/2014 | Yamanaka | H05K 5/03 |
| | | | | 180/68.5 |
| 2015/0251560 | A1* | 9/2015 | Ishikawa | B62D 21/15 |
| | | | | 429/469 |
| 2017/0096067 | A1* | 4/2017 | Murata | H01M 8/04029 |
| 2017/0101031 | A1* | 4/2017 | Ohashi | B60K 15/03006 |
| 2017/0117570 | A1* | 4/2017 | Ishikawa | H01M 8/2475 |
| 2018/0178641 | A1* | 6/2018 | Yamafuji | H01M 8/247 |
| 2018/0297461 | A1* | 10/2018 | Tambo | B60L 3/0007 |
| 2018/0304767 | A1* | 10/2018 | Ichida | B60L 3/0007 |
| 2020/0338975 | A1* | 10/2020 | Tanaka | B60K 1/04 |
| 2020/0361317 | A1* | 11/2020 | Peirone | B60L 3/0007 |
| 2021/0005908 | A1* | 1/2021 | Yoshitomi | B60L 58/30 |
| 2022/0363119 | A1* | 11/2022 | Nakagawa | B60K 1/04 |
| 2024/0010080 | A1* | 1/2024 | Hirawaki | B62D 21/152 |

FOREIGN PATENT DOCUMENTS

| | | |
|---|---|---|
| JP | 2009-252688 A | 10/2009 |
| JP | 2009-262739 A | 11/2009 |
| JP | 2012-96746 A | 5/2012 |
| JP | 2013-86681 | 5/2013 |
| JP | 2014-136531 A | 7/2014 |

* cited by examiner

INSTALLATION STRUCTURE OF ELECTRICAL COMPONENT MODULE IN VEHICLE

TECHNICAL FIELD

The present invention relates to an installation structure of an electrical component module in a vehicle.

BACKGROUND ART

A Patent Literature 1 listed below discloses an installation structure of an inverter unit for a hybrid electrical vehicle (HEV) or the like. The inverter unit is a kind of electrical component modules electrically connected with a battery unit that stores electricity for driving the vehicle. Since the battery unit for driving the vehicle uses high voltage, such electrical component modules also use the high voltage. Therefore, the inverter unit has a high-rigidity housing in order not to expose electrical components within it at an accident of the vehicle.

The inverter unit disclosed in the Patent Literature 1 is installed in a front section of the vehicle body, and attached to a tray firmly fixed with the vehicle body via brackets. When an impact force acts on the inverter unit from its fore side due to a collision in the accident of the vehicle, the brackets are disengaged from the tray together with the inverter unit.

PRIOR-ART LITERATURE

Patent Literature

Patent Literature 1: Japanese Patent Application Publication No. 2013-86681

SUMMARY OF INVENTION

However, the disengaged inverter unit (or the brackets) contacts with the tray, and thereby rearward displacement of the inverter unit is inhibited. If the rearward displacement of the inverter unit is inhibited, a crushable stroke of the front section of the vehicle body cannot be ensured, so that absorption of the impact energy is inhibited.

Therefore, an object of the present invention is to provide an installation structure, in a vehicle, of an electrical component module electrically connected with a battery unit that stores electricity for driving the vehicle that can absorb impact energy adequately.

In the installation structure of the electrical component module in the vehicle according to an aspect of the present invention, the electrical component module electrically connected with a battery unit that stores electricity for driving the vehicle is installed in a front or section or a rear section of the vehicle. The electrical component module is supported by a vehicle body structure member that extends in a lateral direction of the vehicle. The cross-member doesn't overlap with the electrical component module when viewed in any horizontal direction perpendicular to a vertical direction of the vehicle. A release mechanism that releases supporting of the electrical component module by the vehicle body structure member when receiving an impact force from an opposite side to the passenger compartment is provided between the vehicle body structure member and the electrical component module.

DESCRIPTION OF EMBODIMENTS

An installation structure of an electrical component module in a vehicle according to embodiments with reference to the drawings.

First Embodiment

Figure 1:
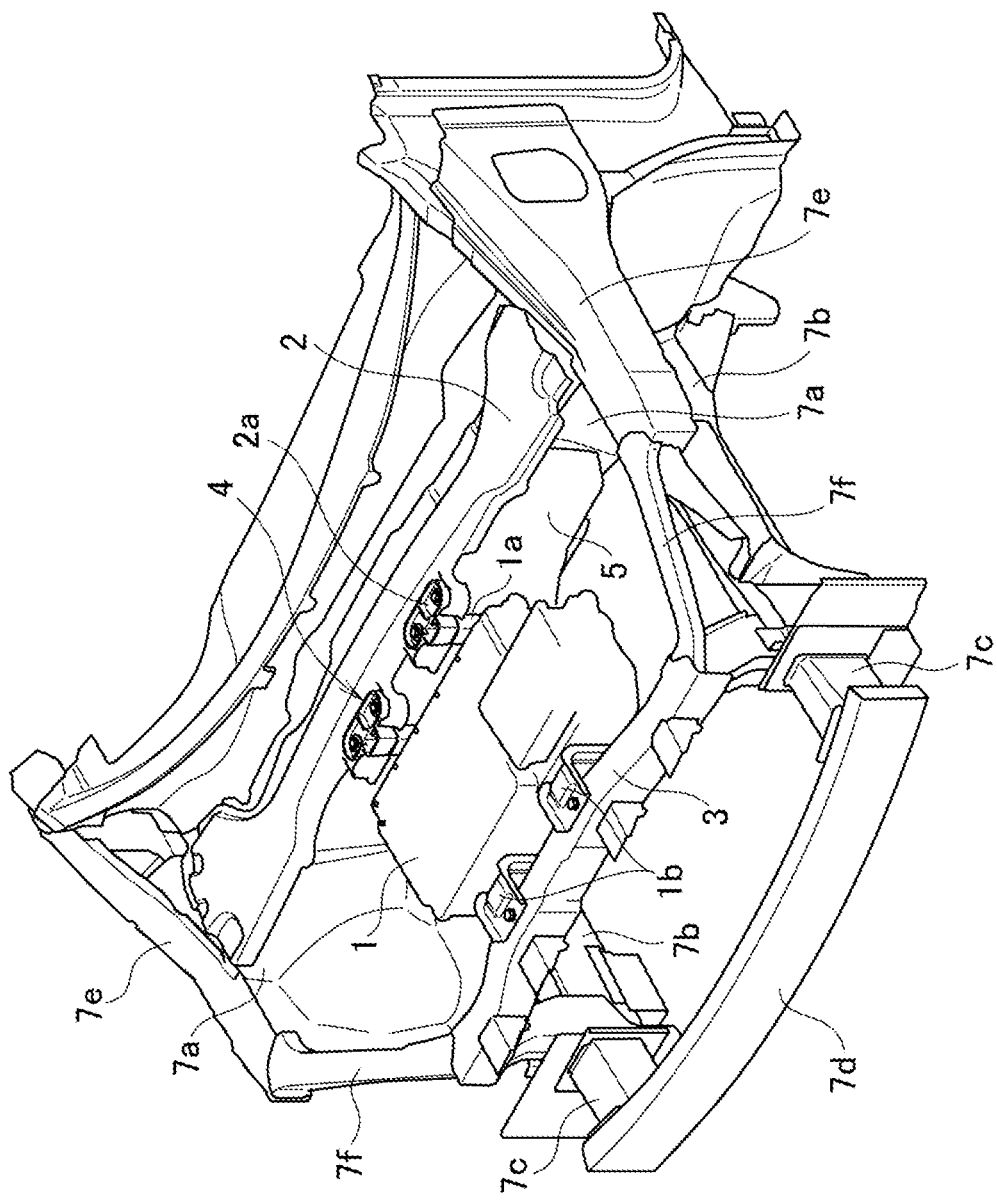
FIG. 1 is a perspective view of an installation structure according to a first embodiment.

An installation structure of a first embodiment will be explained with reference to FIG. 1 to FIG. 5. As shown in FIG. 1, the installation structure of the present embodiment is constructed in a front section (a section on a fore side from a passenger compartment) of a vehicle, specifically in a so-called engine compartment. But, the vehicle of the present embodiment is an electric vehicle (EV), and not an internal engine but a motor generator (MG) (not shown in the drawings) or the like is installed in the engine compartment. The MG functions as an electric motor, and also functions as an electric generator that regenerates electricity while the vehicle reduces its speed. Therefore, a term "motor room" is used hereinafter instead of the term "engine compartment".

In the motor room, an electrical component module 1 for the above-mentioned MG is installed. The electrical component module 1 of the present embodiment is a charge/discharge unit, and accommodates an AC/DC charger that charges a battery unit (see a third embodiment explained later) for driving the MG by an external electrical power source, a DC/DC converter and a junction box. That is, the electrical component module 1 is electrically connected with the above-mentioned battery unit installed in the vehicle. The MG is installed beneath the electrical component module 1. The electrical component module 1 includes a housing made of aluminum alloy, and thereby (hardly) collapses even when receiving an impact from outside (e.g. when the vehicle has an accident).

The installation structure also includes a cross-member 2 extending in a lateral direction of the vehicle in addition to the electrical component module 1. The cross-member 2 is a vehicle body structure member. The electrical component module 1 has a pair of first brackets 1a (see FIG. 2) and a pair of second brackets 1b. A rear portion of the electrical component module 1 is supported by the cross-member 2 via the first brackets 1a. In addition, a front portion of the electrical component module 1 is supported by a radiator support member 3 via the pair of the second brackets 1b. The radiator support member 3 is also a vehicle body structure member. In the vehicle of the present embodiment, the MG, the inverter for the MG and so on are liquid-cooled, and thereby a radiator therefor is supported by the radiator support member 3.

The cross-member 2 is a tower bar (tower brace) that connects a pair of front suspension towers 7a. The cross-member 2 improves rigidity of the vehicle body. The cross-member 2 of the present embodiment is made of aluminum alloy. Both ends of the cross-member 2 are fixed with the front suspension towers 7a, respectively, by bolts or nuts. The cross-member 2 has a pair of intermediate brackets 2a, and the pair of the intermediate brackets 2a constructs an after-explained release mechanism 4 together with the above-mentioned first brackets 1a (see FIG. 2 and FIG. 3). The intermediate brackets 2a are also made of aluminum alloy, and fixed with a main body of the cross-member 2 by bolts 2b (see FIG. 2 and FIG. 3). The cross-member 2 is disposed more closely to the passenger compartment than the electrical component module 1 in a longitudinal direction of the vehicle. The passenger compartment and the motor room are separated from each other by a bulkhead 6.

Figure 4:
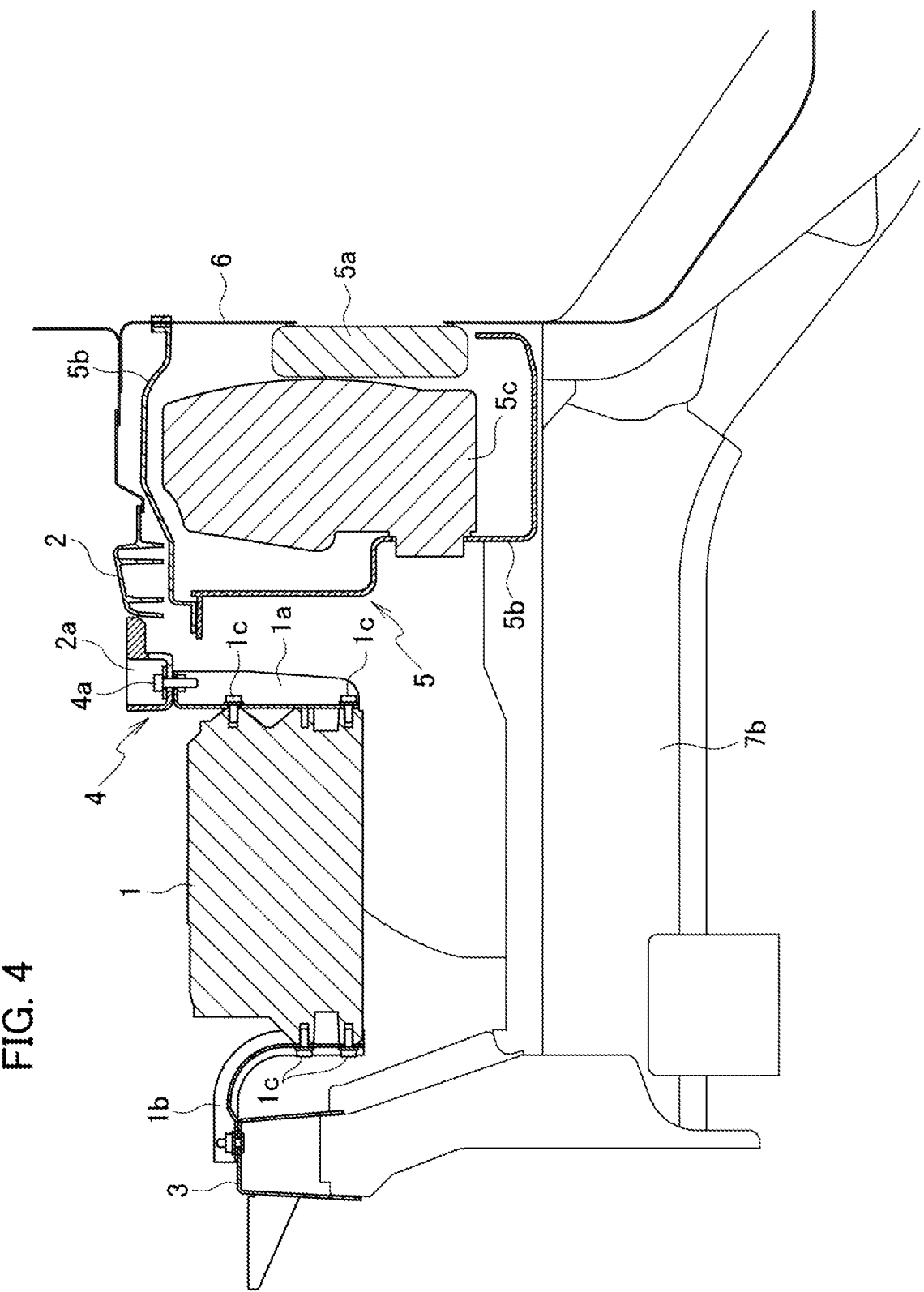
FIG. 4 is a cross-sectioned side view (before collision) showing the installation structure.

As shown in FIG. 4, the cross-member 2 does not overlap with the electrical component module 1 when viewed in any horizontal direction perpendicular to a vertical direction of the vehicle. Hereinafter, this non-overlapping state is also stated as "being offset to each other in the vertical direction". The rear portion of the electrical component module 1 is supported by the cross-member 2 so as to be hung down from the cross-member 2 via the first brackets 1a. Note that the front portion of the electrical component module 1 is also supported by the radiator support member 3 so as to be hung down from the radiator support member 3 via the second brackets 1b. The first brackets 1a and the second brackets 1b are made of steel, and fastened to the housing of the electrical component module 1 by bolts 1c.

In the present embodiment, an air-conditioning (A/C) unit 5 of an air-conditioning system is disposed between the electrical component module 1 and the passenger compartment, more specifically, between the electrical component module 1 and the bulkhead 6. The A/C unit 5 is installed so as to be made close to the bulkhead 6. A/C components 5c such as ducts and a blower fan that are made of plastics are housed in a plastic A/C housing 5b of the A/C unit 5, so that the A/C unit 5 is an auxiliary device that collapses when receiving an impact from outside. Thus, rigidity of the A/C unit 5 (the auxiliary device) is lower than the rigidity of the electrical component module 1, and thereby the A/C unit 5 is collapsed (deformed) easier than the electrical component module 1.

In other words, when the electrical component module 1 is displaced in the longitudinal direction and then pressed onto the fixed A/C unit 5 from a state where the electrical component module 1 and the A/C unit 5 position their installation positions, respectively, a deformation amount of the A/C unit 5 becomes obviously larger than a deformation amount including a case with no deformation) of the electrical component module 1. Similarly to the static loading explained above, a deformation amount of the A/C unit 5 becomes obviously larger than a deformation amount of the electrical component module 1 also by dynamic loading such as a collision.

Other components such as a condenser 5a are also housed in the A/C housing 5b. The condenser 5a is a tube-fin type heat exchanger made of metal, and is disposed closer to the bulkhead 6 at a position that overlaps with the electrical component module 1 in the vertical direction. An opening for introducing conditioned air having passed through the condenser 5a into the passenger compartment is also formed on the bulkhead 6. The A/C component 5c, such as an air shutter that is made of plastic and controls airflow toward the condenser 5a, is also housed in the A/C housing 5b.

Figure 2:
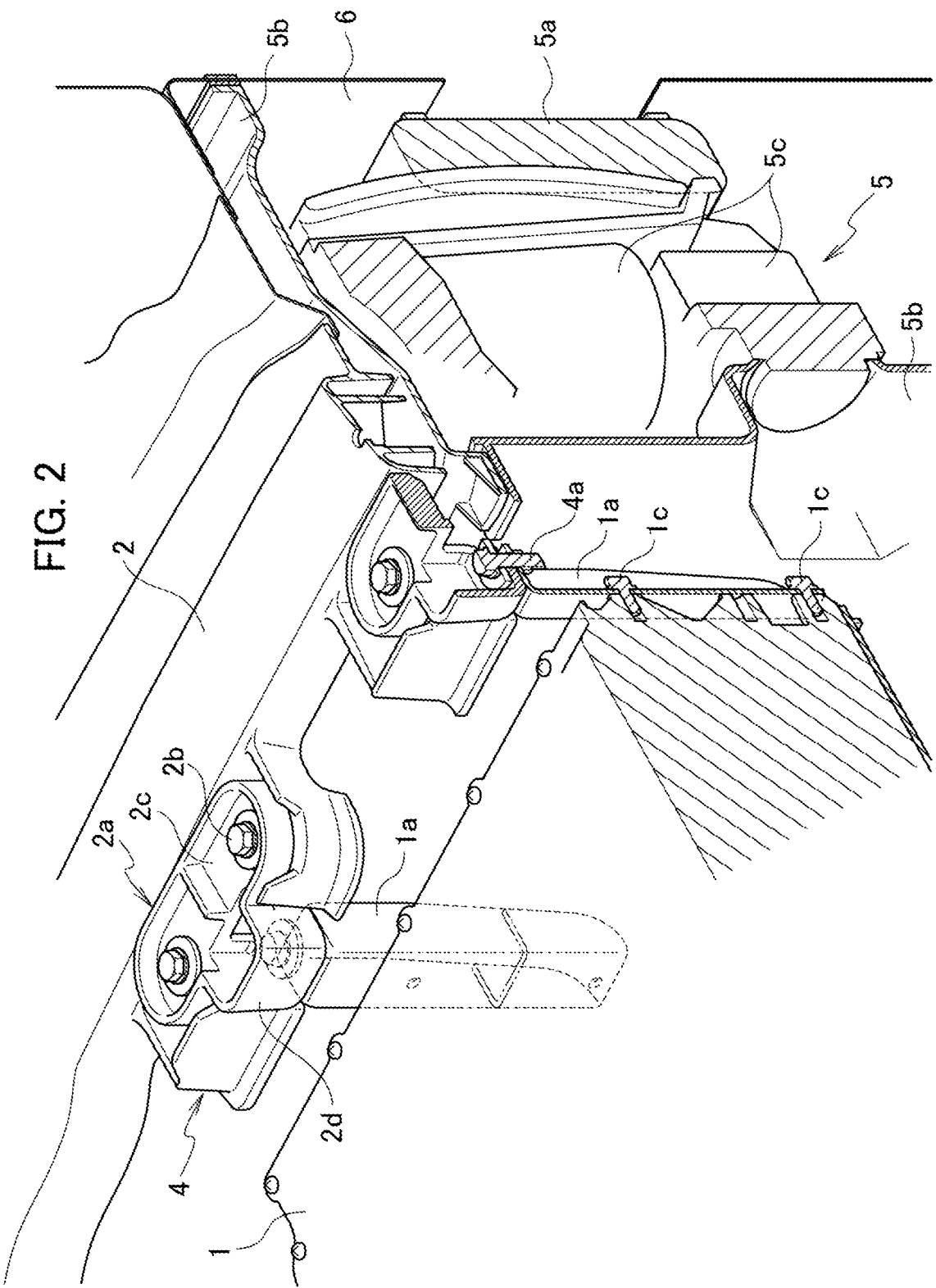
FIG. 2 is a partially cross-sectioned perspective view showing a release mechanism in the installation structure.
Figure 3:
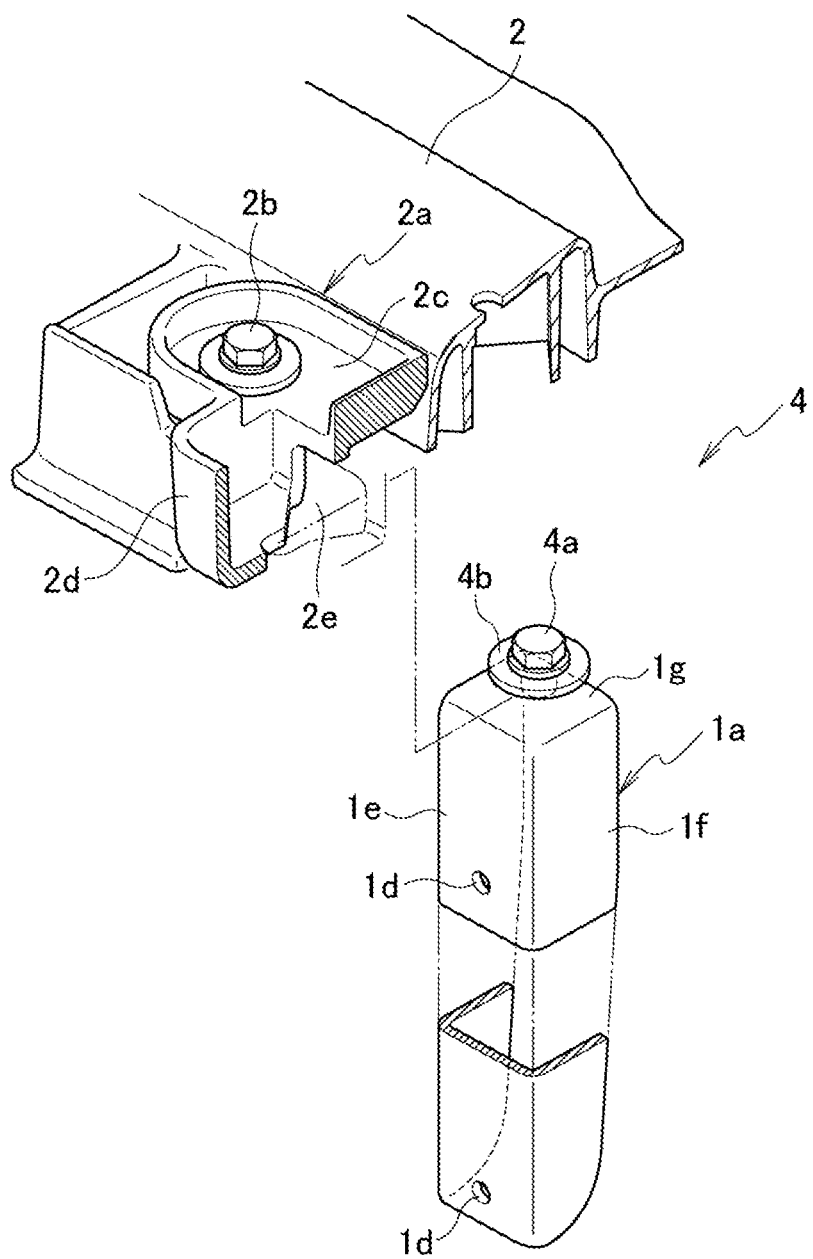
FIG. 3 is an exploded perspective view of the release mechanism.

The above-mentioned release mechanism 4 will be explained in detail with reference to FIG. 2 and FIG. 3. The release mechanism 4 is constructed between the cross-member 2 and the electrical component module 1. The release mechanism 4 releases supporting of the electrical component module 1 by the cross-member 2 when receiving an impact force from an opposite side to the passenger compartment (from a fore side in the present embodiment). Although a pair of the release mechanisms 4 is provided in the present embodiment, they have the same structure and thereby one of them will be explained as their representative. The release mechanism 4 is constructed mainly by the first bracket 1a of the electrical component module 1 and the intermediate bracket 2a of the cross-member 2. The first bracket 1a is an angled member comprised of a front plate 1e, a pair of side plates 1f and an upper plate 1g. The front plate 1e and the pair of the side plates 1f of the first bracket 1a has a horizontal cross-sectional shape having an angled U-shape. Bolt holes 1d into which the above-mentioned bolts 1c are to be inserted are formed on the front plate 1e. The upper plate 1g of the first bracket 1a and the intermediate bracket 2a are fastened together with other by a bolt 4a and a nut. Therefore, a bolt hole into which the bolt 4a is to be inserted is formed on the upper plate 1g. Although the bolt 4a is one of the component parts of the release mechanism 4, it is not a portion of the electrical component module 1 and is not a portion of the cross-member 2, neither.

On the other hand, the intermediate bracket 2a has a shape in which a box portion 2d is protruded laterally from the center of its oval main body 2c. The oval main body 2c is fastened to the main body of the cross-member 2 by bolts 2b. The box portion 2d is protruded also downward from the oval main body 2c. The upper plane of the box portion 2d is opened. A cutout bolt hole 2e is formed from a bottom plate to a back plate (a plate on a side of the passenger compartment) of the box portion 2d. The cutout bolt hole 2e has a shape formed by cutting out a bolt hole into which the bolt 4a is to be inserted at the bottom plate so as to be expanded to the back plate, and has an enough size to pass the head of the bolt 4a (and a washer 4b) though the back plate. The cutout bolt hole 2e is one of important elements of the release mechanism 4.

By inserting the bolt 4a to which the washer 4b is attached into the cutout bolt hole 2e and the bolt hole formed on the upper plate 1g and then fastening it by the nut, the release mechanism 4 is fastened. The fastening of the release mechanism 4 is not released under an ordinary use of the vehicle. However, when an impact force acts on the electrical component module 1 from an opposite side to the passenger compartment (from a fore side in the present embodiment) (e.g. at an accident of the vehicle), the impact force displaces the head of the bolt 4a backward with respect to the intermediate bracket 2a. As the result, the head of the bolt 4a is displaced backward through the cutout bolt hole 2e, and then the bolt 4a and the first bracket 1a are disengaged from the intermediate bracket 2a. In other words, the supporting of the electrical component module 1 by the cross-member 2 is released. The washer 4b provides stable fastening by the bolt 4a while preventing denting of its seating face, and promotes sliding of the head of the bolt 4a while the release.

Note that the first bracket 1a may be configured by being integrated with the housing of the electrical component module 1. However, by providing the first bracket 1a independently as explained above, adaptation to an installation structure having different layout dimensions can be easily achieved. In other words, versatility can be given to the installation of the electrical component module 1. It can be given similarly by the second bracket 1b. In addition, the housing of the electrical component module 1 and the cross-member 2 (including the intermediate brackets 2a) are made of aluminum alloy in the present embodiment. Here, by fastening the housing of the electrical component module 1 to the cross-member 2 via the first brackets 1a (and the second brackets 1b) made of steel that is more flexible as metal than aluminum alloy, minute displacements and vibrations can be absorbed by the first brackets 1a (and the second brackets 1b). (Durability and damping of aluminum-based metal [aluminum alloy] with respect to vibrations are lower than those of iron-based metal [steel].)

Figure 5:
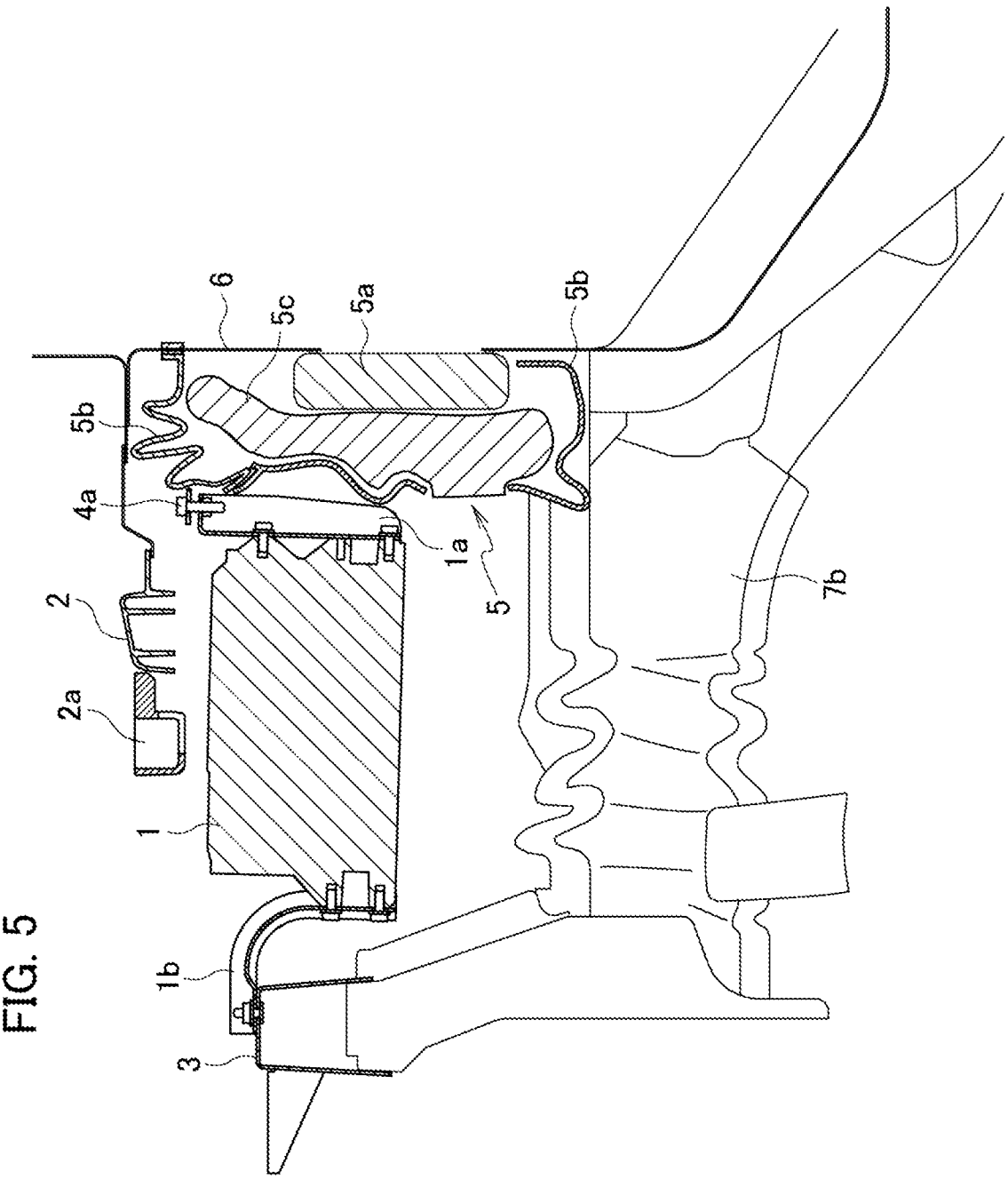
FIG. 5 is a cross-sectioned side view (after collision) showing the installation structure.

It will be explained with reference to FIG. 4 and FIG. 5 how the above-explained installation structure functions when the vehicle comes into collision (when receiving an impact force from its fore side). FIG. 4 shows a state before the collision, in which the electrical component module 1, the cross-member 2 and the A/C unit 5 present the above-explained positional relationship. On the other hand, FIG. 5 shows a state after the collision (or, during the collision). When the vehicle receives the impact force from its fore side, the impact force acts on a front bumper reinforcement 7d attached to a pair of front side members 7b via crush boxes 7c at first. As the result, the crush boxes 7c collapse to absorb the impact energy, and then the impact force acts on the front side members 7b and the radiator support members 3.

Subsequently, the front side members 7b and the intermediate members 7f that connect the radiator support member 3 with front upper members 7e collapse, and then the impact force acts on the electrical component module 1 via the second brackets 1b. Here, the impact force may act directly on the electrical component module 1 due to collapses of the second brackets 1b. When the electrical component module 1 receives the impact force, the supporting of the electrical component module 1 by the cross-member 2 is released by the release mechanism 4. Since the electrical component module 1 is offset downward to the cross-member 2 (with no overlap), the electrical component module 1 is displaced backward relative to the vehicle body without colliding against the cross-member 2. In other words, the cross-member 2 never inhibit the backward displacement of the electrical component module 1. Therefore, a crushable stroke of the front section of the vehicle can be ensured sufficiently by the backward displacement of the electrical component module 1, and thereby the absorption of the impact energy is promoted. If the cross-member 2 that is the vehicle body structure member inhibits the backward displacement of the electrical component module 1, the impact energy cannot be absorbed sufficiently due to an insufficient crushable stroke.

Further, the A/C unit 5 as the auxiliary device is disposed between the electrical component module 1 and the passenger compartment, i.e. behind the electrical component module 1. The electrical component module 1 is displaced backward while collapsing the A/C unit 5 to absorb the impact energy. Therefore, the impact energy can be absorbed efficiently. Especially in the present embodiment, the A/C unit 5 is disposed closer to the bulkhead 6, and thereby the backward displacement of the A/C unit 5 is limited by the bulkhead 6. As the result, the A/C unit 5 is collapsed surely, and the impact energy can be absorbed more efficiently. Note that, by disposing the A/C unit 5 on a fore side from the bulkhead 6 in the motor room, a space volume of the passenger compartment is enlarged and comfortability in the passenger compartment is improved.

In addition, with respect to the A/C unit 5, the condenser 5a that is a tube-fin type heat exchanger made of metal is disposed closest to the bulkhead 6 within it. The A/C unit 5 as the auxiliary device is collapsed by the impact from outside and absorbs the impact energy, but its condenser 5a is relatively hard to collapse. If the first brackets 1a of the electrical component module 1 reach the bulkhead 6, the impact force acts on the bulkhead 6 in a concentrated manner and it is deformed toward the passenger compartment. However, the condenser 5a is disposed closest to the bulkhead 6 in the present embodiment, and thereby the condenser 5a receives the first brackets 1a while being deformed. As the result, the electrical component module 1 can be received surely at a terminative end of the above-mentioned crushable stroke.

In addition, in the inside of the A/C unit 5, the A/C component 5c made of plastic and disposed in front of the condenser 5a made of meatal collapses during the process where the electrical component module 1 is received by the condenser 5a, and thereby absorbs the impact energy. In other words, the above-explained A/C component 5c of the A/C unit 5 as the auxiliary device that absorbs the impact energy functions as an energy absorbing component. Note that a compressor for refrigerant of the air-conditioning system may be disposed within the motor room but outside the A/C unit 5 similarly in a conventional internal combustion engine vehicle, or may be disposed within the A/C unit 5. In a case of disposing the compressor that is made of metal and hardly collapses within the A/C unit 5, the compressor is not disposed in front of the condenser 5a, but is offset laterally to the condenser 5a so as not to overlap with the condenser 5a when viewed from the fore side.

Note that, in the vehicle (EV) of the present embodiment, the MG as an electric motor mechanically connected with drive wheels of the vehicle is electrically connected with the electrical component module 1. However, in a case where the vehicle is a hybrid electric vehicle (HEV), an electric motor mechanically connected with an output shaft of an internal combustion engine may be electrically connected with the electrical component module 1. In this case, the electric motor mechanically connected with the drive wheels of the vehicle and the electric motor mechanically connected with the output shaft of the internal combustion engine may be integrated with each other as a single motor, or provided independently from each other as separated electric motors. These electric motors may be motor generators that can regenerate electricity.

The installation structure of the present embodiment includes the electrical component module 1 that is installed in the front section of the vehicle and is electrically connected with the battery unit that stores electricity for driving the vehicle, and the vehicle body structure member (cross-member) 2 that extends in the lateral direction and supports the electrical component module 1. The vehicle body structure member 2 is disposed on a side of the passenger compartment from (i.e. behind) the electrical component module 1 in the longitudinal direction, and is offset to the electrical component module 1 in the vertical direction (they don't overlap when viewed in the horizontal direction). In addition, the release mechanism 4 that releases the supporting of the electrical component module 1 by the vehicle body structure member 2 when receiving an impact force from an opposite side to the passenger compartment (i.e. the fore side) is provided between the vehicle body structure member 2 and the electrical component module 1. Therefore, when the electrical component module 1 receives the impact force, the supporting of the electrical component module 1 by the vehicle body structure member 2 is released by the release mechanism 4. The electrical component module 1 whose supporting has been released is displaced backward without being inhibited by the vehicle body structure member 2. As the result, the crushable stroke of the front section of the vehicle body can be ensured sufficiently, and thereby the impact energy can be absorbed.

Since the battery unit that stores electricity for driving the vehicle is generally uses high voltage, the electrical component module 1 electrically connected with the battery unit also uses high voltage. Therefore, the electrical component module 1 has the high-rigidity housing so as not to easily collapse. However, the electrical component module 1 that has the high-rigidity housing cannot absorbs the impact energy, because it doesn't collapse. In addition, the electrical component module 1 generates a large peak load when it contacts with another rigid component during the vehicle body deformation at the collision, because it doesn't collapse. But, the electrical component module 1 of the present embodiment is released from the supporting by the vehicle body structure member 2 at the collision, and thereby can be displaced backward without contacting with the other rigid component.

In addition, the installation structure of the present embodiment further includes the auxiliary device (A/C unit) 5 whose rigidity is lower than that of the electrical component module 1 between the electrical component module 1 and the passenger compartment. Therefore, the electrical component module 1 collapses the auxiliary device 5 and is displaced backward while absorbing the impact energy. As the result, the impact energy can be absorbed efficiently.

In addition, in the installation structure of the present embodiment, the auxiliary device 5 is the A/C unit 5. Therefore, the installation structure can be constructed effectively in the front section of the vehicle in a case where the vehicle is an EV or an HEV, and thereby it becomes possible to construct a front section structure of the vehicle that has superior impact energy absorbing property. In addition, since the A/C unit 5 is disposed in the motor room, comfortability in the passenger compartment is improved.

Here in the present embodiment, the vehicle body structure member 2 is the cross-member 2 that connects the pair of the front suspension towers 7*a*. The electrical component module 1 is installed in the front section of the vehicle, and is offset downward to the cross-member 2 (positions beneath it and doesn't overlap with it when viewed in the horizontal direction). The A/C unit 5 is disposed on a fore side from the bulkhead 6. A front suspension mechanism and a drivetrain, such as drive wheels (front wheels) that are steered and the MG connected with drive shafts, is disposed at a lower area in the motor room. Therefore, by hanging the electrical component module 1 down from the cross-member (tower bar) 2 to support it, space efficiency in the motor room can be improved. In addition, the A/C unit 5 is received by the bulkhead 6 on its rear side when the A/C unit 5 collapses. As the result, the A/C unit 5 can be collapsed surely, and thereby can absorb the impact energy more efficiently.

Further in the present embodiment, the A/C unit 5 has the tube-fin type heat exchanger (condenser) 5*a* made of metal in its inside. Therefore, the condenser 5*a* receives, while it collapses, the electrical component module 1 that is displaced backward. As the result, the electrical component module 1 can be surely received at the terminative end of the crushable stroke.

Second Embodiment

An installation structure of a second embodiment will be explained with reference to FIG. 6 to FIG. 10. An electrical component module 1 in the installation structure according to the present embodiment is an inverter unit for an MG connected with rear wheels. The electrical component unit (inverter unit) 1 is electrically connected with the above-mentioned battery unit (see the third embodiment explained later) that stores electricity for driving the vehicle. The electrical component module 1 includes a box-shaped housing made of aluminum alloy, and thereby (hardly) collapses even when receiving an impact from outside (e.g. when the vehicle has an accident). Electrical components, such as power modules and smoothing capacitors, are housed in the housing. In addition, the electrical component module (inverter unit) 1 is electrically connected with the MG (electric motor) that is mechanically connected with the drive wheels or with the output shaft of the internal combustion engine.

In addition, a release mechanism 4 in the installation structure according to the present embodiment is the same as the release mechanism 4 of the above-explained first embodiment. Therefore, the same configurational elements of the electrical component module 1 and the release mechanism 4 are labelled with identical reference sign, and their detailed explanations will be omitted. But, in the present embodiment, the electrical component module 1 is installed in a rear section of the vehicle by reversing its front and rear. In other words, the electrical component module 1 installed in the rear section receives an impact force at its same side face at a collision of the vehicle. In addition, the electrical component module 1 is (not supported by being hung down but) supported from beneath. Therefore, the first brackets 1*a* and the second brackets 1*b* are attached to the housing of the electrical component module 1 upside down. In other words, as explained in the first embodiment, versatility is given to the installation of the electrical component module 1 by the first brackets 1*a* and the second brackets 1*b*.

Figure 6:
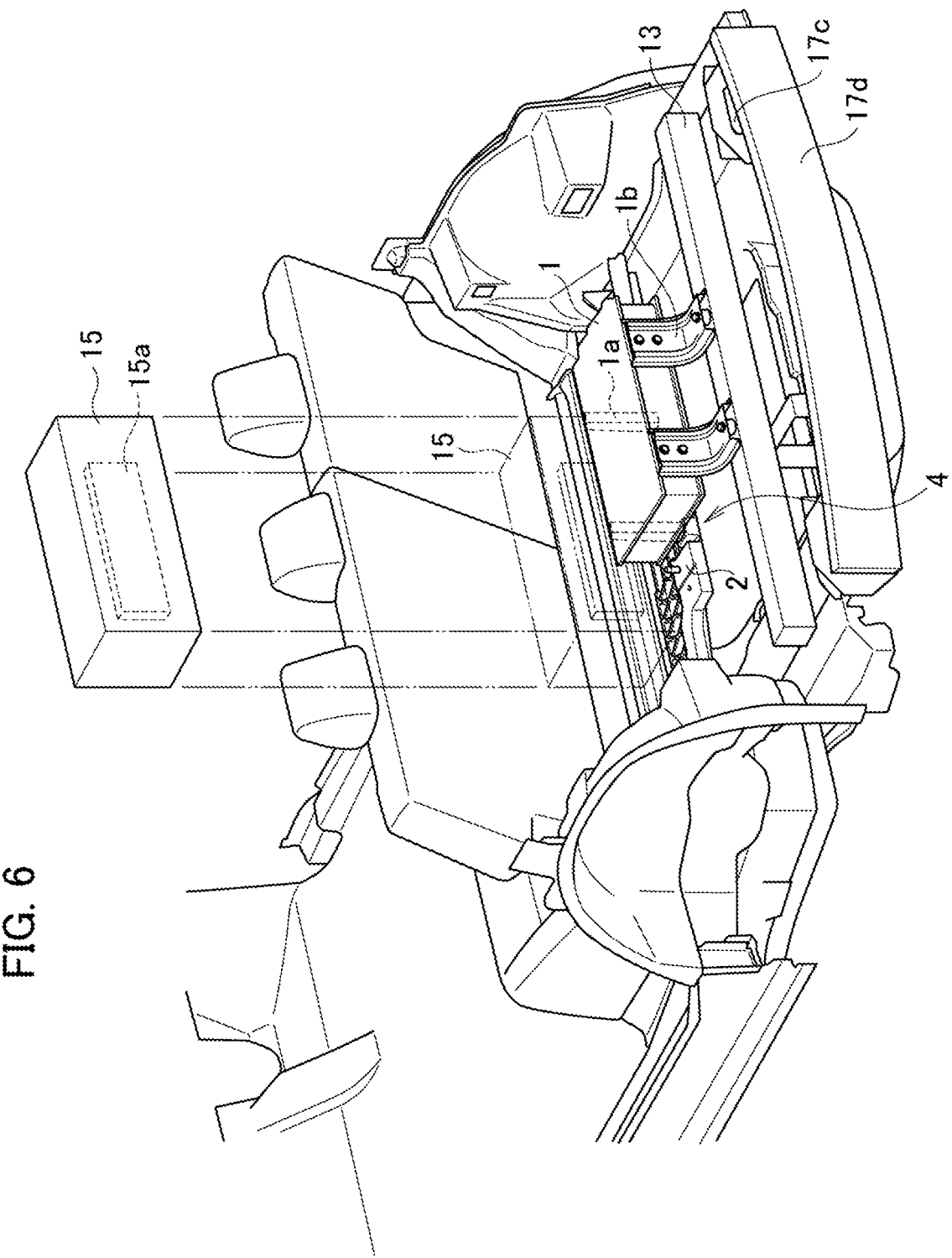
FIG. 6 is a perspective view of an installation structure according to a second embodiment.
Figure 7:
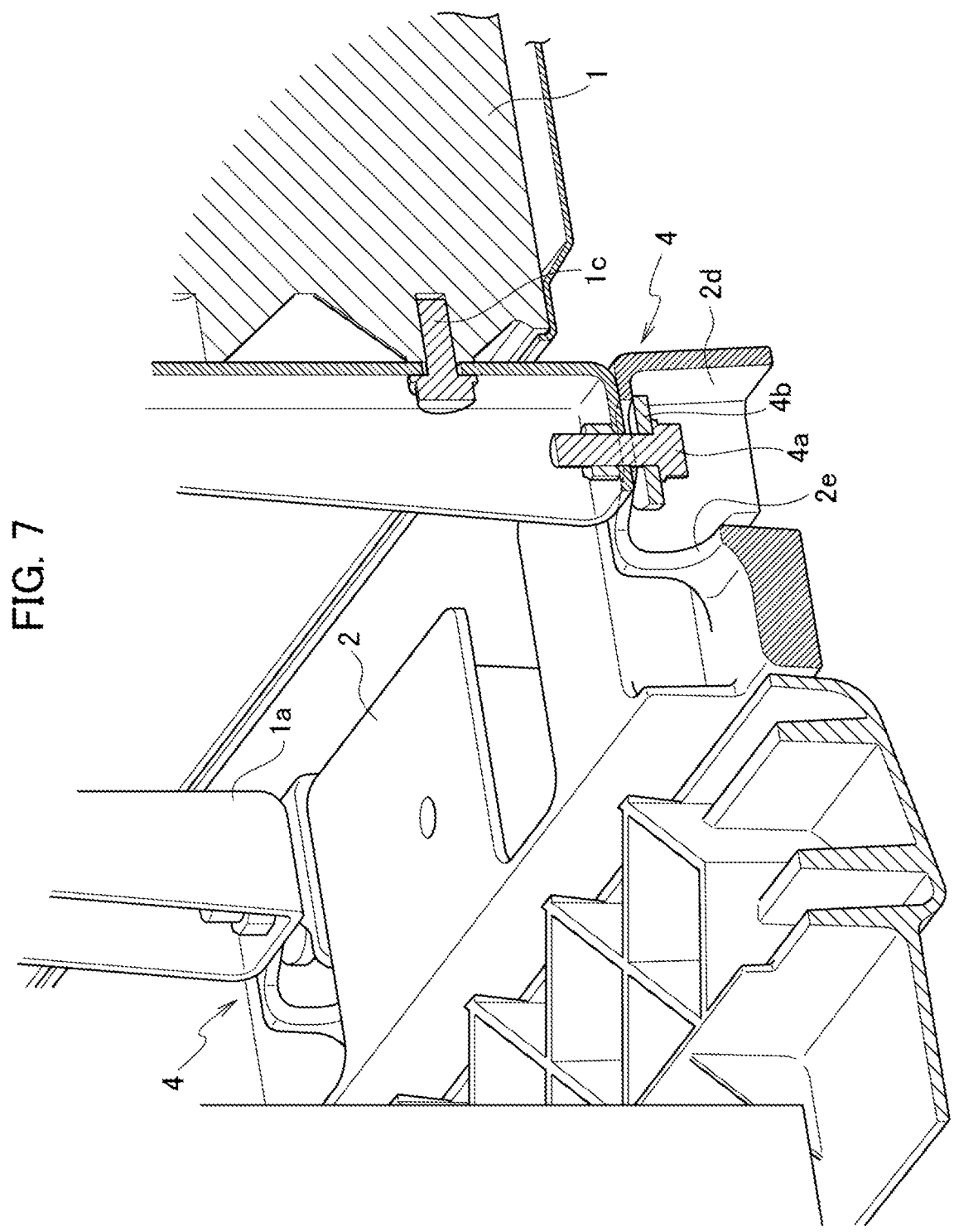
FIG. 7 is a partially cross-sectioned perspective view showing a release mechanism in the installation structure.

As shown in FIG. 6, the installation structure of the present embodiment is constructed in the rear section of the vehicle (a section on a rear side from the passenger compartment), specifically in a luggage room. The above-mentioned electrical component module 1 is installed in the luggage room. The MG is installed beneath the electrical component module 1. In the present embodiment, the MG as an electric motor mechanically connected with the drive wheels (rear wheels) of the vehicle is electrically connected with the electrical component module 1. Note that there may be variations for its powertrain, such as a four-wheel drive HEV in which its front wheels are driven by the internal combustion engine and an MG and its rear wheels are driven only by an MG, and a four-wheel drive EV in which its front wheels and its rear wheels are driven by an MG.

The installation structure of the present embodiment includes a cross-member 2 extending the lateral direction of the vehicle in addition to the electrical component module 1. The cross-member 2 is the vehicle body structure member. As explained above, the electrical component module 1 has the pair of the first brackets 1*a* and the pair of the second brackets 1*b*. A front portion of the electrical component module 1 is supported by the cross-member 2 via the first brackets 1*a*. In addition, a rear portion of the electrical component module 1 is supported by a rear-side cross-member 13 via the pair of the second brackets 1b. The rear-side cross-member 13 is also the vehicle body structure member. The cross-member 2 connects a pair of rear side members 17b (see FIG. 9), and also improves the rigidity of the vehicle body. The cross-member 2 of the present embodiment is made of aluminum alloy. Both ends of the cross-member 2 are fixed with the rear side members 17b, respectively, by bolts or nuts. The cross-member 2 of the present embodiment doesn't have the intermediate brackets 2a of the first embodiment, but has box portions 2d monolithically at its main body (see FIG. 7).

The box portions 2d of the cross-member 2 construct the release mechanism 4 (see FIG. 7 and FIG. 8) together with the first brackets 1a of the electrical component module 1. The cross-member 2 is disposed more closely to the passenger compartment than the electrical component module 1. As shown in FIG. 9, the cross-member 2 is offset to the electrical component module 1 in the vertical direction (they don't overlap when viewed in the horizontal direction). The front portion of the electrical component module 1 is supported from beneath by the cross-member 2 via the first brackets 1a. The rear portion of the electrical component module 1 is also supported by the rear-side cross-member 13 via the second brackets 1b.

In the present embodiment, an audio unit 15 is disposed between the electrical component module 1 and the passenger compartment. The audio unit 15 is disposed just behind rear seats 8, and its front lower end is fixed with a front-side cross-member 16. Audio components such as speakers and a woofer duct is housed within the audio unit 15, and the audio unit 15 is the auxiliary device that would collapse when receiving an impact from outside. That is, the rigidity of the audio unit 15 (auxiliary device) is lower than the rigidity of the electrical component module 1, and thereby the audio unit 15 collapses more easily (deforms more easily) than the electrical component module 1. An amplifier unit 15a is also housed within the audio unit 15. The amplifier unit 15a has a housing made of metal (aluminum alloy). The housing also functions as a heatsink for radiating heats of the amplifier. The amplifier unit 15a is disposed at a position that overlaps with the electrical component module 1 in the vertical position. Note that a bulkhead that separates the passenger compartment and the luggage room may be disposed at a position of the front-side cross-member 16.

Figure 8:
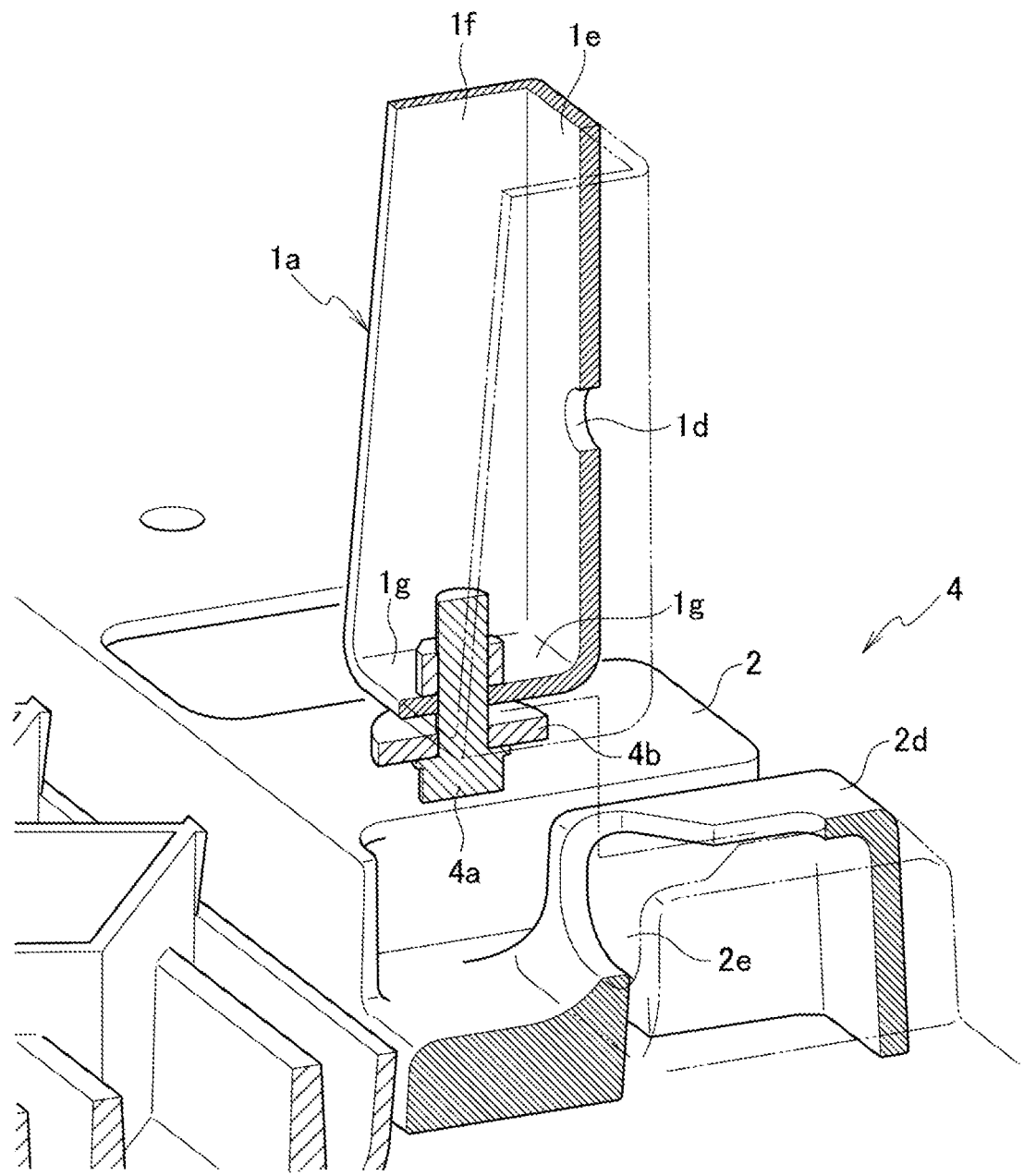
FIG. 8 is an exploded perspective view of the release mechanism.
Figure 9:
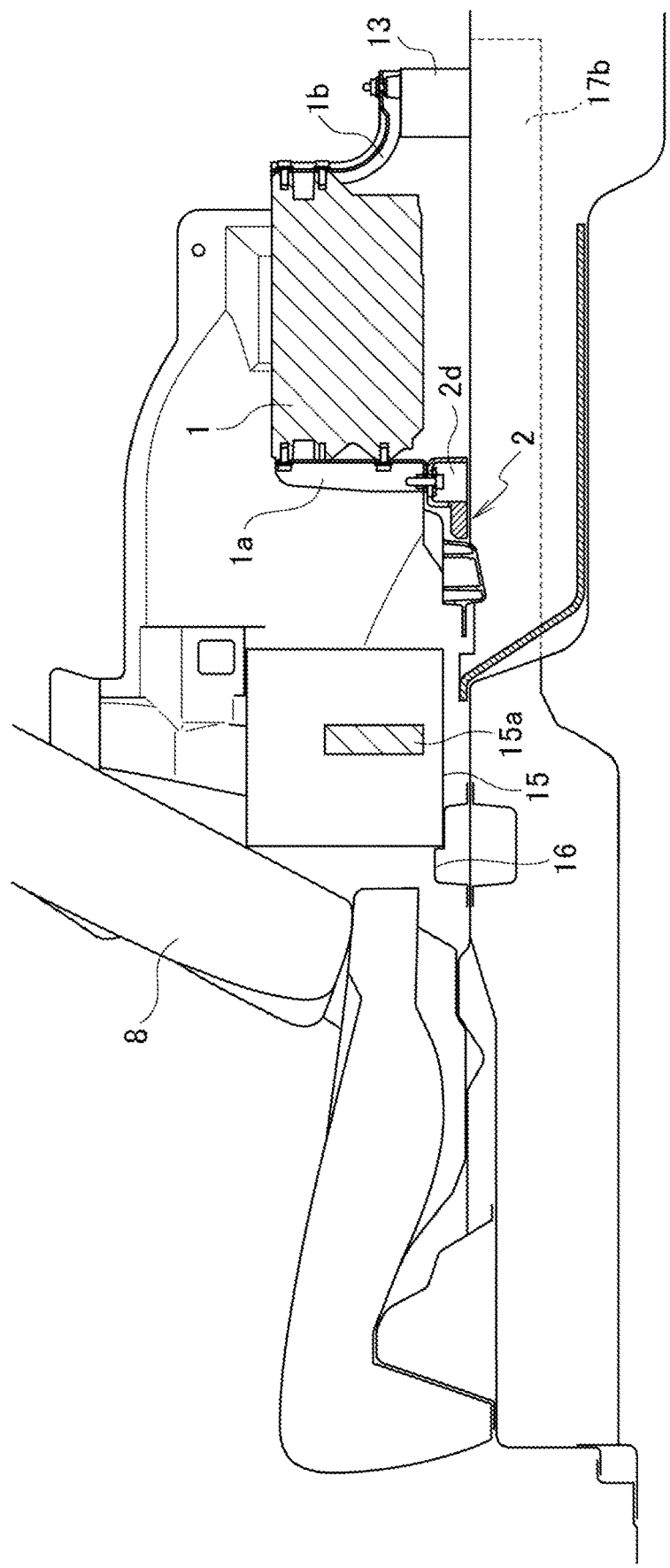
FIG. 9 is a cross-sectioned side view (before collision) showing the installation structure.

Although the first brackets 1a (and the second brackets 1b) are fastened to the housing of the electrical component module 1 upside down as explained above, the release mechanism 4 has a similar structure of the release mechanism 4 of the first embodiment as shown in FIGS. 8 and 9.

Figure 10:
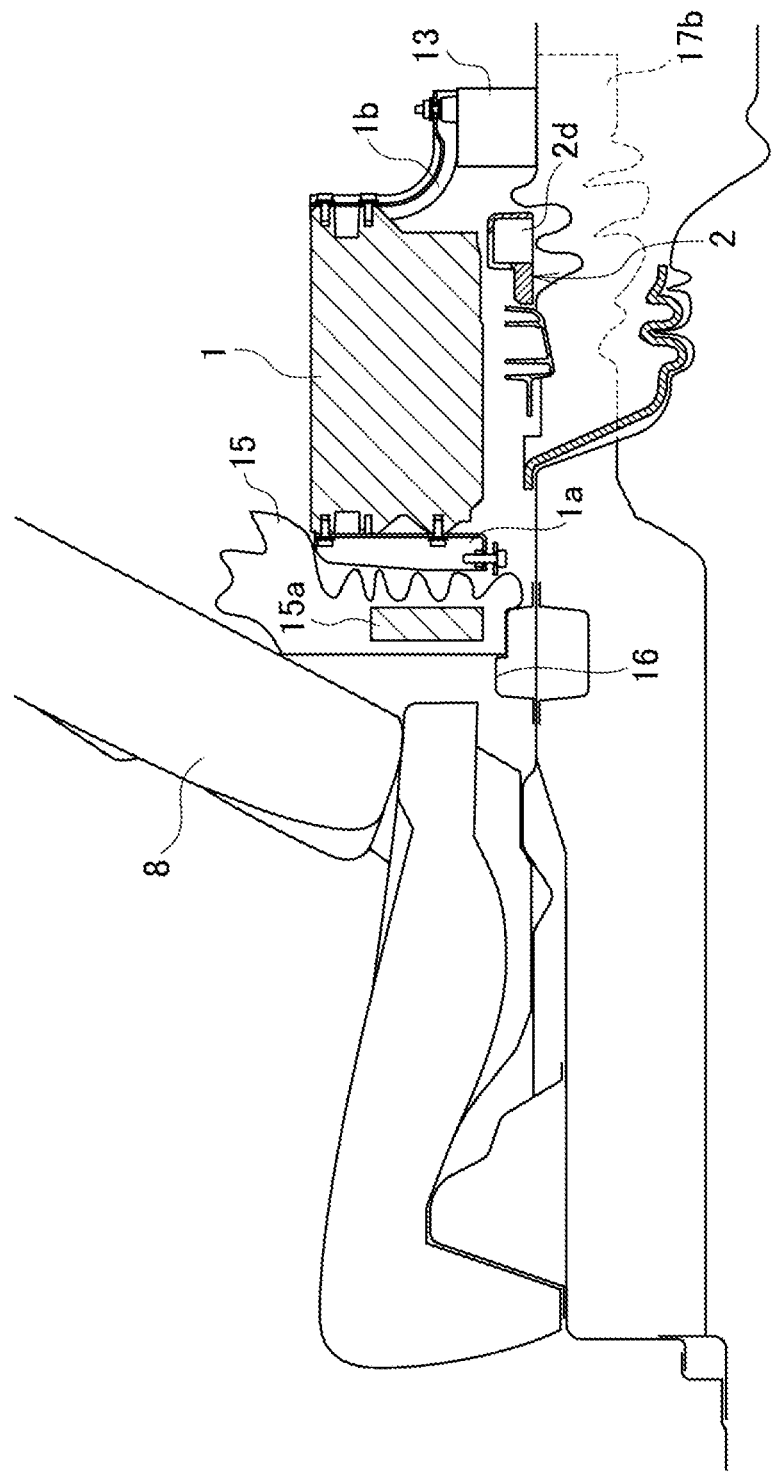
FIG. 10 is a cross-sectioned side view (after collision) showing the installation structure.

It will be explained with reference to FIG. 9 and FIG. 10 how the above-explained installation mechanism functions when another vehicle comes into collision from rear (when receiving an impact force from the rear side). FIG. 9 shows a state before the collision, and FIG. 10 shows a state after the collision (or, during the collision). When the vehicle receives the impact force from its rear side, the impact force acts on a rear bumper reinforcement 17d attached to a pair of rear side members 17b via crush boxes 17c (see FIG. 6) at first. As the result, the crush boxes 17c collapse to absorb the impact energy, and then the impact force acts on the rear side members 17b and the rear-side cross-member 13.

Subsequently, the rear side members 17b collapse, and then the impact force acts on the electrical component module 1 via the second brackets 1b. Here, the impact force may act directly on the electrical component module 1 due to collapses of the second brackets 1b. When the electrical component module 1 receives the impact force, the supporting of the electrical component module 1 by the cross-member 2 is released by the release mechanism 4. Since the electrical component module 1 is offset upward with respect to the cross-member 2 (with no overlap), the electrical component module 1 is displaced forward relative to the vehicle body without colliding against the cross-member 2. In other words, the cross-member 2 never inhibit the forward displacement of the electrical component module 1. Therefore, a crushable stroke of the rear section of the vehicle can be ensured sufficiently by the forward displacement of the electrical component module 1, and thereby the absorption of the impact energy is promoted. If the cross-member 2 that is the vehicle body structure member inhibits the forward displacement of the electrical component module 1, the impact energy cannot be absorbed sufficiently due to an insufficient crushable stroke.

Further, the audio unit 15 as the auxiliary device is disposed between the electrical component module 1 and the passenger compartment, i.e. in front of the electrical component module 1. The electrical component module 1 is displaced forward while collapsing the audio unit 15 to absorb the impact energy. Therefore, the impact energy can be absorbed efficiently. The forward displacement of the audio unit 15 is limited by the front-side cross-member 16 and the rear seats 8. As the result, the audio unit 15 can be collapsed surely, and thereby can absorb the impact energy more efficiently.

In addition, the audio unit 15 has the amplifier unit 15a that has the metal housing within it. The audio unit 15 as the auxiliary device is collapsed by the impact from outside and absorbs the impact energy, but its amplifier unit 15a is relatively hard to collapse. The amplifier unit 15a receives the first brackets 1a while being deformed similarly to the condenser 5a of the first embodiment. Even when the amplifier unit 15a is displaced forward, it can be received by the front-side cross-member 16 and the rear seats 8. As the result, the electrical component module 1 can be received surely at a terminative end of the crushable stroke. Note that, also in the present embodiment, the electric motor mechanically connected with the output shaft of the internal combustion engine may be electrically connected with the electrical component module 1. For example, the electric motor installed in the front section of the vehicle is electrically connected with the electrical component module 1 installed in the rear section of the vehicle by a wiring harness.

The installation structure of the present embodiment includes the electrical component module 1 that is installed in the rear section of the vehicle and is electrically connected with the battery unit that stores electricity for driving the vehicle, and the vehicle body structure member (cross-member) 2 that extends in the lateral direction and supports the electrical component module 1. The vehicle body structure member 2 is disposed on a side of the passenger compartment (i.e. in front of) the electrical component module 1 in the longitudinal direction, and is offset to the electrical component module 1 in the vertical direction (they don't overlap when viewed in the horizontal direction). In addition, the release mechanism 4 that releases the supporting of the electrical component module 1 by the vehicle body structure member 2 when receiving an impact force from an opposite side to the passenger compartment (i.e. the rear side) is provided between the vehicle body structure member 2 and the electrical component module 1. Therefore, when the electrical component module 1 receives the impact force, the supporting of the electrical component module 1 by the vehicle body structure member 2 is released by the release mechanism 4. The electrical component module 1 whose supporting has been released is displaced forward without being inhibited by the vehicle body structure member 2. As the result, the crushable stroke of the rear section of the vehicle body can be ensured sufficiently, and thereby the impact energy can be absorbed.

In addition, the installation structure of the present embodiment further includes the auxiliary device (audio unit) 15 whose rigidity is lower than that of the electrical component module 1 between the electrical component module 1 and the passenger compartment. Therefore, the electrical component module 1 collapses the auxiliary device 15 and is displaced forward while absorbing the impact energy. As the result, the impact energy can be absorbed efficiently.

In addition, in the installation structure of the present embodiment, the electrical component module 1 is installed in the rear section of the vehicle, and the auxiliary device 15 is the audio unit 15. Therefore, the installation structure can be constructed effectively in the rear section of the vehicle in a case where the vehicle is an EV or an HEV, and thereby it becomes possible to construct a rear section structure of the vehicle that has superior impact energy absorbing property.

Here in the present embodiment, the vehicle body structure member 2 is the cross-member 2 that connects the pair of the rear side members 17*b*. In addition, the electrical component module 1 is offset upward to the cross-member 2 (positions above it and doesn't overlap with it when viewed in the horizontal direction). A rear suspension mechanism and a drivetrain, such as drive wheels (rear wheels) and the MG connected with drive shafts, is disposed beneath the luggage room (the rear side members 17*b*). Therefore, by supporting the electrical component module 1 from beneath by the cross-member 2 that connects the rear side members 17*b*, space efficiency beneath the floor of the luggage room can be improved.

Further in the present embodiment, the audio unit 15 has the amplifier unit 15*a* made of metal in its inside. Therefore, the amplifier unit 15*a* receives, while it collapses, the electrical component module 1 that is displaced forward. As the result, the electrical component module 1 can be surely received at the terminative end of the crushable stroke.

Modified Example

The auxiliary device in the second embodiment is the audio unit 15. However, an A/C unit may be installed in the rear section of the vehicle as the auxiliary device whose rigidity is lower than that of the electrical component module 1. Recently, sold is a vehicle in which an A/C unit for rear seats is stalled in addition to an A/C unit for front seats. In such a vehicle, there may be a case where the A/C unit for rear seats is stalled in the rear section of the vehicle. According to the present embodiment, in the FIG. 6 to FIG. 10, the reference sign 15 indicates the A/C unit, and the reference sign 15*a* indicates the condenser (tube-fin type heat exchanger made of metal). Therefore, the above-explained advantages brought by the second embodiment can be also brought by the present modified example similarly.

Especially in the present modified example, the auxiliary device is the A/C unit 15. Therefore, the installation structure can be constructed effectively in the rear section of the vehicle in a case where the vehicle is an EV or an HEV, and thereby it becomes possible to construct a rear section structure of the vehicle that has superior impact energy absorbing property.

In addition, the A/C unit 15 has the tube-fin type heat exchanger (condenser) 15*a* made of metal within it. Therefore, the condenser 15*a* receives, while it collapses, the electrical component module 1 that is displaced forward. As the result, the electrical component module 1 can be surely received at the terminative end of the crushable stroke.

Third Embodiment

Figure 11:
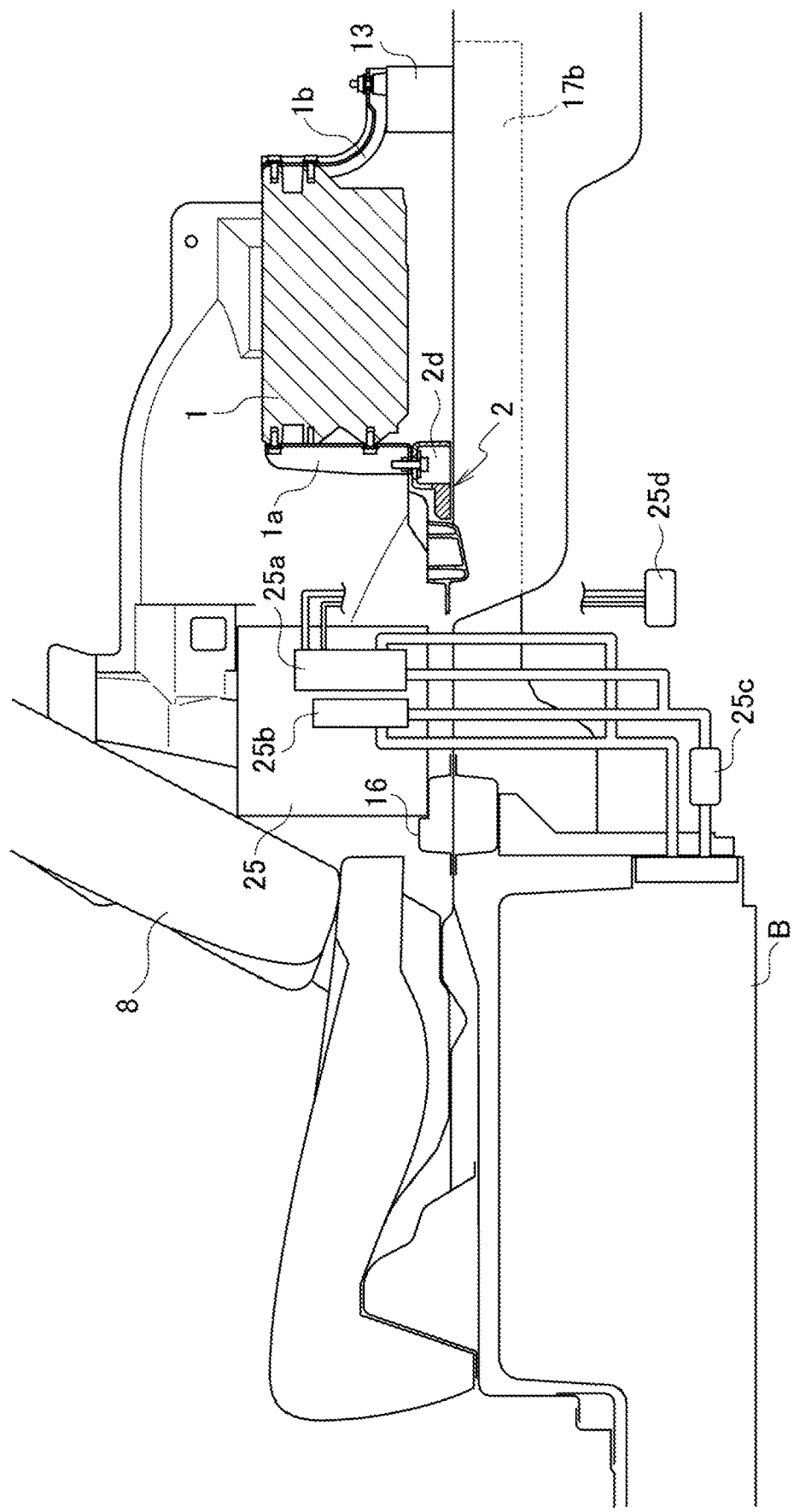
FIG. 11 is a cross-sectioned side view (before collision) showing an installation structure according to a third embodiment.

An installation structure of a third embodiment will be explained with reference to FIG. 11. A vehicle of the present embodiment is also an EV, and includes the battery unit B beneath the floor of the passenger compartment. In the resent embodiment, the auxiliary device is a battery thermo-control unit 25 that controls temperature of the battery unit B. The inverter unit as the electrical component module 1, the cross-member 2 as the vehicle body structure member, and structures of the vehicle body surrounding them are the same as those of the above-explained second embodiment. Therefore, these identical configurational elements are labelled with identical reference signs and thereby their detailed explanations will be omitted.

The battery unit B for the EV is warmed or cooled according to its operating environment. For example, the battery unit B is warmed at a start-up under the low temperature environment, and cooled under high-load continuous operation. The battery thermo-control unit 25 of the present embodiment controls the temperature of the battery unit B by using coolant. The battery thermo-control unit 25 has a cooler 25*a* for cooling the coolant and a heater 25*b* for heating the coolant in its inside. The cooler 25*a* and the battery unit B is connected with each other by cooler circulation pipes. The heater 25*b* and the battery unit B is connected with each other by heater circulation pipes. Although the pipes within the battery unit B are not shown in the drawing, the coolant flows though the pipes in the battery unit B, and thereby the temperature of the battery unit B is controlled.

The cooler 25*a* of the present embodiment is a heat exchanger made of metal, and utilizes refrigerant. Therefore, the cooler 25*a* is connected with a compressor 25*d* via refrigerant circulation pipes. The compressor 25*d* functions also as a pump for recirculating the refrigerant. In the inside of the cooler 25*a*, heats of the coolant is transferred to the refrigerant, and thereby the coolant is cooled. The cooler 25*a* and the compressor 25*d* of the present embodiment function also as an evaporator and a compressor of the air-conditioning system. (The evaporator and the compressor of the air-conditioning system are utilized as the cooler 25*a* and the compressor 25*d*.)

The heater 25*b* may be a heater that generates heats by using electrical power, or may use a heat pump system installed in the vehicle. In a case of using the heat pump system, the heater 25*b* may be a heat exchanger made of metal. The cooler 25*a* (and the heater 25*b*) is disposed at a position that overlaps with the electrical component module 1 in the vertical direction. A pump 25*c* for recirculating the coolant and a valve (not shown in the drawing) for switching recirculation paths are provided on the recirculation pipes of the coolant. Components such as pipes and a reservoir tank of the coolant are also housed in the battery thermo-control unit 25, and the battery thermo-control unit 25 collapses when receiving an impact from outside.

In the present embodiment, the battery thermo-control unit 25 is disposed between the electrical component module 1 and the passenger compartment. The battery thermo-control unit 25 is disposed just behind rear seats 8, and its front lower end is fixed with the front-side cross-member 16. Note that a bulkhead that separates the passenger compartment and the luggage room may be disposed at a position of the front-side cross-member 16.

When the above-explained installation structure suffers a collision from rear by another vehicle (when it receives an impact force from the rear side), an impact force acts on the rear bumper reinforcement 17d at first, and then the impact energy is absorbed while the crush boxes 17c collapse. Subsequently, the rear side members 17b collapse, and then the impact force acts on the electrical component module 1 via the second brackets 1b. Here, the impact force may act directly on the electrical component module 1 due to collapses of the second brackets 1b. When the electrical component module 1 receives the impact force, the supporting of the electrical component module 1 by the cross-member 2 is released by the release mechanism 4. The electrical component module 1 is displaced forward relative to the vehicle body without colliding against the cross-member 2. A crushable stroke of the rear section of the vehicle can be ensured sufficiently by the forward displacement of the electrical component module 1, and thereby the absorption of the impact energy is promoted.

Further, the battery thermo-control unit 25 that is the auxiliary device having the lower rigidity than that of the electrical component module 1 is disposed between the electrical component module 1 and the passenger compartment, i.e. in front of the electrical component module 1. The electrical component module 1 is displaced forward while collapsing the battery thermo-control unit 25 to absorb the impact energy. The forward displacement of the battery thermo-control unit 25 is limited by the front-side cross-member 16 and the rear seats 8. As the result, the battery thermo-control unit 25 can be collapsed surely, and thereby can absorb the impact energy more efficiently.

In addition, the battery thermo-control unit 25 has the cooler 25a (and the heater 25b) that is the heat exchanger made of metal within it. The battery thermo-control unit 25 as the auxiliary device is collapsed by the impact from outside and absorbs the impact energy, but its cooler 25a (and the heater 25b) is relatively hard to collapse. The cooler 25a (and the heater 25b) receives the first brackets 1a while being deformed similarly to the condenser 5a of the first embodiment. Even when the cooler 25a (and the heater 25b) is displaced forward, it can be received by the front-side cross-member 16 and the rear seats 8. As the result, the electrical component module 1 can be received surely at a terminative end of the crushable stroke. Note that, also in the present embodiment, the electric motor mechanically connected with the output shaft of the internal combustion engine may be electrically connected with the electrical component module 1.

Also in the installation structure of the present embodiment, when the electrical component module 1 receives the impact force from the rear, the supporting of the electrical component module 1 by the vehicle body structure member 2 is released by the release mechanism 4. The electrical component module 1 whose supporting has been released is displaced forward without being inhibited by the vehicle body structure member 2. As the result, the crushable stroke of the rear section of the vehicle body can be ensured sufficiently, and thereby the impact energy can be absorbed.

In addition, the installation structure of the present embodiment further includes the auxiliary device (battery thermo-control unit) 25 whose rigidity is lower than that of the electrical component module 1 between the electrical component module 1 and the passenger compartment. Therefore, the electrical component module 1 collapses the auxiliary device 25 and is displaced forward while absorbing the impact energy. As the result, the impact energy can be absorbed efficiently.

In addition, in the installation structure of the present embodiment, the electrical component module 1 is installed in the rear section of the vehicle, and the auxiliary device 25 is the battery thermo-control unit 25. Therefore, the installation structure can be constructed effectively in the rear section of the vehicle in a case where the vehicle is an EV or an HEV, and thereby it becomes possible to construct a rear section structure of the vehicle that has superior impact energy absorbing property.

Here in the present embodiment, the vehicle body structure member 2 is the cross-member 2 that connects the pair of the rear side members 17b. In addition, the electrical component module 1 is offset upward to the cross-member 2. A rear suspension mechanism and a drivetrain, such as drive wheels (rear wheels) and the MG connected with drive shafts, is disposed beneath the luggage room (the rear side members 17b). Therefore, by supporting the electrical component module 1 from beneath by the cross-member 2 that connects the rear side members 17b, space efficiency beneath the floor of the luggage room can be improved.

Further in the present embodiment, the battery thermo-control unit 25 has the cooler 25a (and the heater 25b) made of metal in its inside. Therefore, the cooler 25a (and the heater 25b) receives, while it collapses, the electrical component module 1 that is displaced forward. As the result, the electrical component module 1 can be surely received at the terminative end of the crushable stroke.

Note that the present invention is not limited to the above-explained embodiment. For example, the electrical component module 1 of the first embodiment may be an inverter unit as in the second embodiment. In addition, the cross-member 2 in the second and third embodiments is fixed with the pair of the rear side members 17b by bolts or the like. However, the cross-member 2 as the vehicle body structure member may be a cross-member welded between the rear side members 17b.

In addition, the release mechanism 4 in the above embodiment(s) is a slide drop-off mechanism in which its bolts 4a slide and then drops off from the intermediate brackets 2a through the cutoff bolt holes 2e. In such a slide drop-off mechanism, the bolt(s) 4a may be formed monolithically with the first bracket(s) 1a. Note that the bolt(s) 4a in this case is not a "bolt" but an engagement protrusion(s) protruded upward from the first bracket(s) 1a, but this engagement protrusion is a portion of the release mechanism 4 and not a part of the first bracket 1a (i.e. the electrical component module 1). In other words, the bolt 4a and the engagement protrusion can overlap with the cross-member 2 (the intermediate bracket 2a) when viewed in the horizontal direction. The above-mentioned engagement protrusion is pressed into the intermediate bracket 2a through the cutoff bolt hole 2e.

Further, the release mechanism 4 in the above embodiment(s) is a slide drop-off mechanism as explained above. However, a combined body of the first bracket 1a and the intermediate bracket 2a may be insert-molded such that the first bracket 1a and the intermediate bracket 2a are integrally jointed with each other by engineering plastic, for example. It may be a release mechanism such that the engineering plastic is broken when it receives the impact force from the opposite side to the passenger compartment and then the supporting of the electrical component module 1 by the cross-member (vehicle body structure member) 2 is released. The release mechanism may be such a breakage drop-off mechanism. The breakage drop-off mechanism may be constructed by a weaken portion formed on a metal portion without using the engineering plastic.

REFERENCE SIGNS LIST 1 electrical component module
1a first bracket
1b second bracket
2 cross-member (vehicle body structure member)
4 release mechanism
5 air-conditioning unit (auxiliary device)
5a condenser (tube-fin type heat exchanger)
6 bulkhead
15 audio unit (auxiliary device)
15a amplifier unit
25 battery thermo-control unit (auxiliary device)
25a cooler (heat exchanger)
25b heater
B battery unit

The invention claimed is:

1. An installation structure of an electrical component module in a vehicle, the structure comprising:
the electrical component module that is installed in a front of the vehicle, and connected with a battery unit configured to store electricity for driving the vehicle; and
a vehicle body structure member that extends in a lateral direction of the vehicle, and supports the electrical component module such that the electrical component module is hung down from the vehicle body structure member,
wherein the vehicle body structure member is disposed closer to a passenger compartment of the vehicle than the electrical component module, and does not overlap with the electrical component module when viewed in any horizontal direction perpendicular to a vertical direction of the vehicle, and
wherein a release mechanism is provided between the vehicle body structure member and the electrical component module, the release mechanism releasing the supporting and hanging of the electrical component module from the vehicle body structure member when receiving an impact force from an opposite side to the passenger compartment.

2. The installation structure according to claim 1, further comprising
an auxiliary device on a drop-off side on which the electrical component module drops off from the vehicle body structure member with respect to the electrical component module being supported and hung from the vehicle body structure member when the supporting and hanging of the electrical component module is released by the release mechanism, rigidity of the auxiliary device being lower than that of the electrical component module.

3. An installation structure of an electrical component module in a vehicle, the structure comprising:
the electrical component module that is installed in a front of the vehicle, and connected with a battery unit configured to store electricity for driving the vehicle; and
a vehicle body structure member that extends in a lateral direction of the vehicle, and supports the electrical component module,
wherein the vehicle body structure member is disposed closer to a passenger compartment of the vehicle than the electrical component module, and does not overlapped with the electrical component module when viewed in any horizontal direction perpendicular to a vertical direction of the vehicle,
wherein a release mechanism is provided between the vehicle body structure member and the electrical component module, the release mechanism releasing the supporting of the electrical component module by the vehicle body structure member when receiving an impact force from an opposite side to the passenger compartment,
wherein an auxiliary device is provided on a drop-off side on which the electrical component module drops off from the vehicle body structure member with respect to the electrical component module being supported by the vehicle body structure member when the supporting of the electrical component module is released by the release mechanism, rigidity of the auxiliary device being lower than that of the electrical component module, and
wherein the auxiliary device is an air-conditioning unit.

4. The installation structure according to claim 3, wherein the vehicle body structure member is a cross-member that connects a pair of front suspension towers of the vehicle,
the electrical component module positions beneath the cross-member not to overlap with the cross-member when viewed in the horizontal direction, and
the air-conditioning unit is disposed on a fore side from a bulkhead of the vehicle.

5. The installation structure according to claim 3, wherein the air-conditioning unit has a tube-fin type heat exchanger made of metal therewithin.

6. The installation structure according to claim 4, wherein the air-conditioning unit has a tube-fin type heat exchanger made of metal therewithin.

* * * * *